US012307847B1

(12) United States Patent
Kelly et al.

(10) Patent No.: US 12,307,847 B1

(45) Date of Patent: May 20, 2025

(54) CREDENTIALING ACCESS BASED ON PRIOR LOCATION

(71) Applicant: Circle Computer Resources, Inc., Cedar Rapids, IA (US)

(72) Inventors: Seth Kelly, Cedar Rapids, IA (US); Jay Hess, Cedar Rapids, IA (US)

(73) Assignee: Circle Computer Resources, Inc., Cedar Rapids, IA (US)

( * ) Notice: Subject to any disclaimer, the term of this patent is extended or adjusted under 35 U.S.C. 154(b) by 222 days.

(21) Appl. No.: 18/187,402

(22) Filed: Mar. 21, 2023

Related U.S. Application Data

(60) Provisional application No. 63/322,778, filed on Mar. 23, 2022.

(51) Int. Cl.

*G07C 9/28* (2020.01)
*G07C 9/00* (2020.01)
*G07C 9/27* (2020.01)

(52) U.S. Cl.

CPC ........... *G07C 9/28* (2020.01); *G07C 9/00571* (2013.01); *G07C 9/27* (2020.01); *G07C 2209/04* (2013.01); *G07C 2209/08* (2013.01)

(58) Field of Classification Search

CPC ........ G07C 9/28; G07C 9/00571; G07C 9/27; G07C 2209/04; G07C 2209/08; G07C 9/00

USPC .................................................. 340/5.28, 5.2

See application file for complete search history.

(56) References Cited

U.S. PATENT DOCUMENTS

| | | | | |
|---|---|---|---|---|
| 7,010,691 | B2 * | 3/2006 | Wheeler | H04L 63/083 713/172 |
| 7,376,839 | B2 | 5/2008 | Carta et al. | |
| 7,616,091 | B2 | 11/2009 | Libin | |
| 7,752,652 | B2 | 7/2010 | Prokupets et al. | |
| 7,937,669 | B2 | 5/2011 | Zhang et al. | |
| 8,505,488 | B2 | 8/2013 | Pratt | |
| 8,598,982 | B2 | 12/2013 | Bhandari et al. | |
| 8,604,903 | B2 * | 12/2013 | Bowen | G07C 9/27 340/5.5 |
| 8,836,470 | B2 | 9/2014 | Pineau et al. | |
| 9,336,633 | B2 | 5/2016 | Radicella et al. | |
| 9,761,071 | B2 * | 9/2017 | Woodard | H04W 4/021 |
| 10,043,325 | B2 * | 8/2018 | Friedli | E05F 15/79 |
| 10,332,325 | B2 * | 6/2019 | Lee | G07C 9/00571 |
| 10,629,019 | B2 * | 4/2020 | Neely | G07C 9/00571 |
| 11,903,680 | B2 * | 2/2024 | Frank | G01J 5/07 |
| 2008/0163361 | A1 | 7/2008 | Davis et al. | |
| 2024/0038011 | A1 * | 2/2024 | Studerus | G07C 9/10 |

* cited by examiner

*Primary Examiner* — Nam V Nguyen

(74) *Attorney, Agent, or Firm* — SHUTTLEWORTH & INGERSOLL, PLC; Jason R. Sytsma

(57) ABSTRACT

A database for storing access credentials and rules for entering the secured destination location where access in controlled by an access controller in communication with the database over a communication channel. The access controller comprises of a reader for receiving the security token and providing the security token to the database to authenticate an identity of the holder of the security token.

15 Claims, 5 Drawing Sheets

Site Table

| SiteID (302) | SiteName (304) | SiteCategory (308) | LastUpdated (312) |
|---|---|---|---|
| NumericalID | StringName | Green | DateTime |
| | 12 3rd St. (306) | Yellow | |
| | | Red (309) | |

FIG.3A

Rules Table

| EnterSiteCategory (310) | SiteCategoryWaitAdd (313) | WaitTimeAdded (314) | LastUpdated (316) |
|---|---|---|---|
| Green | Red | 0 Days | DateTime |
| Green | Yellow | 0 Days | DateTime |
| Yellow | Green | 1 Day | DateTime |
| Yellow | Red | 0 Days | DateTime |
| Red | Yellow | 3 Days | DateTime |
| Red | Green | 7 Days | DateTime |

FIG.3B

Employee Table

| EmployeeID (316) | EmployeeName (318) |
|---|---|
| 1 | Jay Hess |

FIG.3C

Employee Time Table

| 320 EmployeeID | 322 Category | 324 TimeRemaining | 326 LastUpdated |
|---|---|---|---|
| 1 | Green | 3 Days | DateTime |
| 1 | Red | 0 Days | DateTime |
| 1 | Yellow | 1 Day | DateTime |

FIG.3D

Device Table

| 328 Device ID NumericalID | 330 SiteID NumericalID | 332 LastedPushCompleted Data/Time | 334 PushStatus Success | 336 LastUpdated DateTime |
|---|---|---|---|---|
| | | | Failure | |

FIG.3E

CREDENTIALING ACCESS BASED ON PRIOR LOCATION

The present application claims the benefit of U.S. Provisional Patent Application No. 63/322,778 filed Mar. 23, 2022, the contents of which are hereby incorporated herein by reference.

TECHNICAL FIELD

This invention relates generally to access systems for restricting access to controlled areas, and more specifically to an access system that restricts access to otherwise credentialed secure areas based on prior location.

BACKGROUND INFORMATION

Pork is the most consumed meat in the world. In United States, it is a $23 billion industry with more than 60,000 pork producers. In the U.S. most pigs are raised by producers with over 5,000 swine and most are owned by firms that each own over 50,000 swine.

The typical hog production cycle lasts about 4 years. This is a function of the biological cycle of the hog, which consists of four basic phases: (1) breeding and gestation, (2) farrowing, (3) feeding, and (4) finishing. During these phases, pigs are raised in confinement buildings where environmental conditions can be carefully managed. The pigs are carefully maneuvered from location to location following each phase keeping them separate from other separated groups of pigs to manage disease outbreaks.

Despite advancements in vaccines and other medications, pigs in confinement buildings may still be exposed to or spread diseases among each other and among confinement buildings. Disease outbreaks, such as swine flu, can lead to the eradication of an entire farm's supply and quarantining of all neighboring facilities. This can be disastrous for farm.

No matter how carefully environmental conditions are controlled or how secure the confinement buildings are, the weak point in a farms' production is its staff. By simply moving from building to building among a single farm or among other farms, people can carry harmful viruses and bacteria into the enclosed environments of confinement building. Many systems have been designed to control or inhibit the spread of diseases in confinement buildings, including access control systems, but all of these systems are rendered useless by accidental mistakes of staff.

Accordingly, there is a need for an access control system that restricts access to otherwise credentialed secure areas based on prior location. While the foregoing need is presented in the context of livestock confinement operations, this need is applicable to any environment where access control to a particular location can be instantaneously revoked or suspended based on a person's prior location.

SUMMARY

Disclosed is a system for controlling access to a secured destination location to a holder of a security token. The system comprises of a database for storing access credentials and rules for entering the secured destination location; and an access controller in communication with the database over a communication channel. The access controller comprises of a reader for receiving the security token and providing the security token to the database to authenticate an identity of the holder of the security token. The security token is associated with the rules in the database for entering the secured destination location. The rules comprise a time field and a prior location information of the security token where entrance to the secured destination location is denied pending a lapse of a predetermined amount of time since the prior location information of the security token was associated in the database. An access control device for allowing access to the secured destination location upon receipt of an access control signal from the access controller once the predetermined amount of time has lapsed.

In an embodiment, the communication channel can be wired or wireless. The access control device can be any type of physical or virtual lock to a secured location. The access controller can also comprise a clock for providing timing information to the time field.

In an embodiment, the database further comprises a site table comprising a site ID to uniquely identify the secured destination location and a site category to assign a security level to the site ID. A rules table comprising an entrance category, a destination category, and a time rule can be provided, wherein the time rule restricts access to the secured destination location based on the site category of the prior location information and the site category of the secured destination location and a predetermined amount of time in the time rule. The predetermined amount of time in the time rule can be increased based on an increased level of security of the site category. The database can also comprise an employee table to associate a person with the holder of the security token. An employee time table can be provided and comprise a time remaining field for each site category to provide time remaining information before the person associated with the holder of the security token may enter the secured destination location associated with each site category. The database can comprise a device table to associate the access controller at the site ID with last updated timing information.

In another embodiment, a method for controlling access to a secure destination location is provided. The method comprises receiving a security token; authenticating an identity of a holder of the security token; and denying entrance to the secured destination location pending a lapse of a predetermined amount of time based on a prior location of the holder of the security token.

In an embodiment, the method comprises of assigning a security level to a site category field in a database and a time rule for the site category field and associating the site category field and the time rule with a site ID field in the database, wherein the time rule comprises the predetermined amount of time. The method can include restricting access to the secured destination location based on the site category field of the prior location and the predetermined amount of time in the time rule. The method can also include increasing the predetermined amount of time for each time rule based on an increased level of security for the corresponding site category field. The method can include creating an employee table in the database and associating a person with the holder of the security token. The method can include providing time remaining information for the person associated with the holder of the security token to enter the destination secured location associated with each site category.

BRIEF DESCRIPTION OF THE DRAWINGS

These and other features and advantages of the present invention will be better understood by reading the following detailed description, taken together with the drawings wherein:

FIG. 3A is a site table.

FIG. 3B is a rules table.

FIG. 3C is an employee table.

FIG. 3D is an employee time table.

FIG. 3E is a device table.

DETAILED DESCRIPTION OF THE PREFERRED EMBODIMENTS

Figure 1:
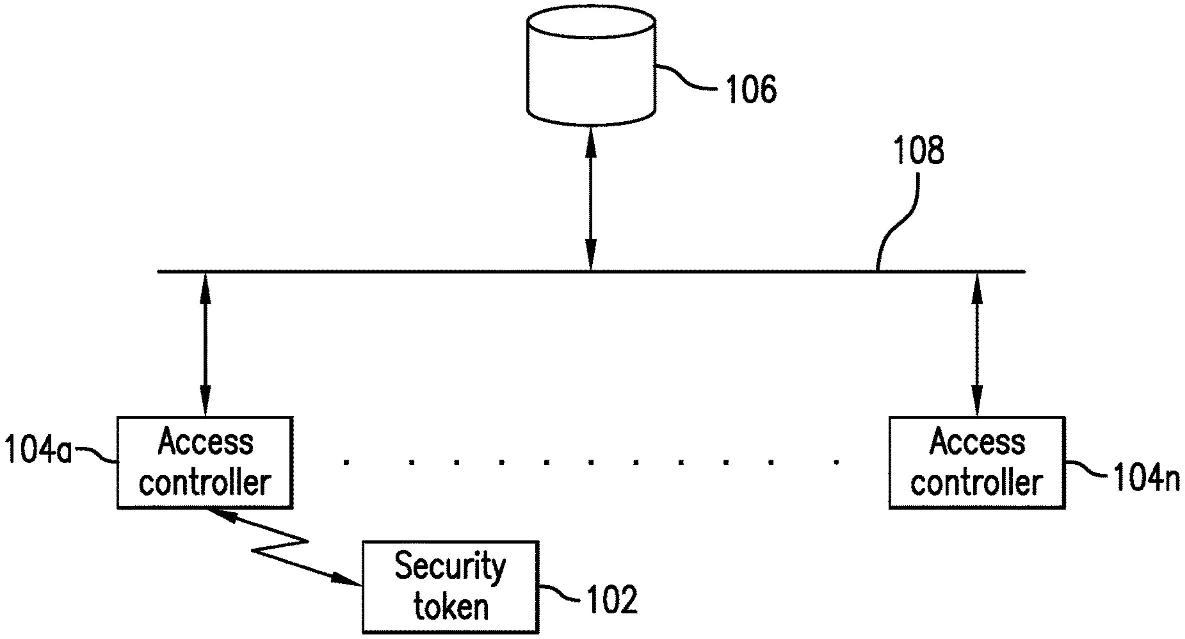
FIG. 1 is a block diagram of the primary components in an access control system in accordance with one embodiment with the present invention.

Referring to FIG. 1, is an access control system 100 according to this disclosure. An authorized user receives a security token 102 for authenticating access by the user to one or more secured locations restricted by a corresponding one or more access controllers 104 (represented by access controllers 104*a*-104*n*). Access privileges are controlled by a central database 106. When the user presents his security token 102 to the access controller 104, the access controller authenticates the user and verifies his permissions which can be restricted based on the user's prior locations.

More specifically, central database 106 stores the authentication and permissions for system 100 and pushes and pulls data to and from access controllers 104 over a communication channel 108. Database 106 can be any type of authentication and rules-based database implemented in or in connection with one or more servers. In the illustrated embodiment, each access controller 104 and/or database 106 pushes and pulls data to and from each other for local credentials and rules storage. This way if communication is lost, access controllers 104 still operates. In other embodiments, access controller can require constant connection with central database 106 for operation.

Communication channel 108 can be any type of wired or wireless communication network, including the public internet or a local area network. In a wireless implementation, there is no need for a dedicated wire connection between each of access controllers 104 and central database 106. As such, a wireless implementation can reduce implementation complexity and the number of points of potential failure that can exist in conventional systems. A wireless communication channel 108 can operate with a number of communication protocols, including, without limitation, transmission control protocol/Internet protocol (TCP/IP).

Figure 2:
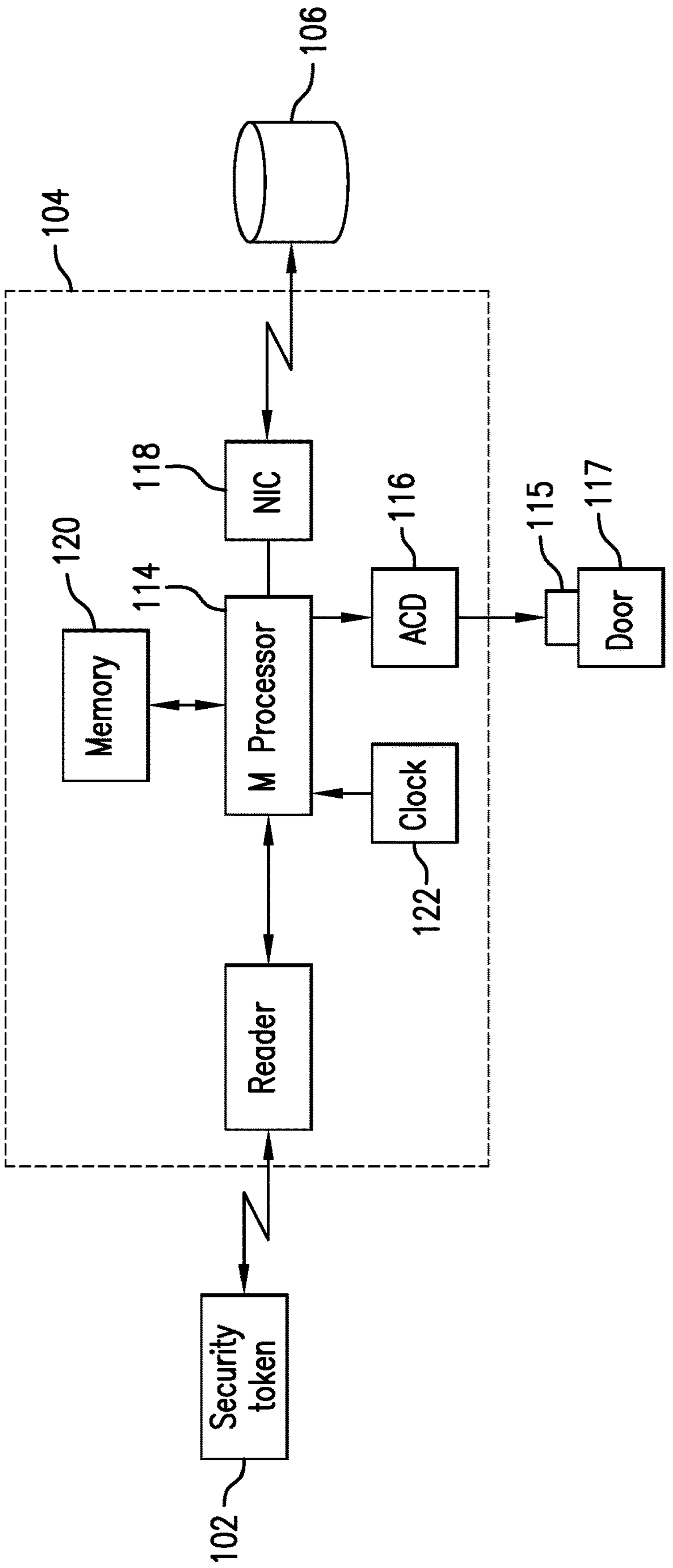
FIG. 2 is a block diagram of the access controller of FIG. 1.

Referring to FIG. 2, the components of access controller 104 are shown in more detail. Access controller 104 generally comprises of a reader 112 capable of automatically reading data from security token 102 and, optionally, writing data back to security token 102. Reader 112 can be an RF antenna used to communicate back and forth with security token 102 or any other type of wireless communication protocol (RFID, Bluetooth LE, etc.).

A microprocessor 114 comprises the hardware and software necessary to store and execute cryptographic applications, to read/write data from/to security token 102, and transmit data to and receive data from database 106. Microprocessor 114 may include any type of general purpose processor or computer, controller, or application specific integrated circuit.

Following authentication of security token 102 and permission in accordance with the rules discussed below, microprocessor 114 provides an output to an access control device 116, which secures the location, device, or information being protected. In one embodiment, access control device 116 can be an output to a mechanical actuator 115 that unlocks a door 117 to a secured location. Examples of a typical access control device 116 include, without limitation, an electronic lock, a magnetic lock, or an electric strike for a door, a lock for a computer system, a lock for a database, a lock on a financial account, or a lock on a computer application.

Microprocessor 114 also comprises a network interface card 118 to communicate with database 106 over communication channel 108. In addition, microprocessor 114 comprises a memory 120 to store application data, host unique ID, and other functionality. Memory 120 may comprise volatile and/or non-volatile memory. Examples of non-volatile memory include Read Only Memory (ROM), Erasable Programmable ROM (EPROM), Electronically Erasable PROM (EEPROM), Flash memory, and the like. Examples of volatile memory include Random Access Memory (RAM), Dynamic RAM (DRAM), Static RAM (SRAM), or buffer memory.

Access controller 104 may also comprise a clock 122 that tracks the current time to provide the time to microprocessor 114 to determine if the holder of security token 102 is permitted access to the location protected by access control device 116. This way, if communication with database 106 is lost, the current time and count-down for permissions can be retained.

Referring now to FIGS. 3A, 3B, 3C, 3D, and 3E, show are the site table, employee table, rules table, employee table, employee time table, and device table, respectively, stored in central database 106. Tables 3A-3E, collectively, contain the authentication and rule for provisioning access to the secured area restricted by access control device 116. When the user presents his security token 102 to access controller 104, the access controller 104 authenticates the user and verifies his permissions to enter the protected area controlled by access control device 116 based on the amount of lapsed time subsequent to a user's prior location.

Beginning with the site table of FIG. 3A, a field for site ID 302 contains the unique ID for access controller 104 which also corresponds to a dedicate location of the secured area restricted by access control device 116. Site ID 302 can be associated with a site name 304 comprising of alphanumerical characters for an easily recognized location name and with a site address 306 for the geographical coordinates or postal address of the location. Each secured area can be designated in a site category field 308 with a security level 309. In the illustrated embodiment, three security levels of green (g), yellow (y), and red (r) represent increasing levels of security for the secured area restricted by access control device 116. Finally, a last updated field 312 can define when the category for the site was last updated.

Continuing with the rules table of FIG. 3B, is a lookup table for the rules for gaining access to the secured area restricted by access control device 116. The rules table comprises of an entrance category 310, a destination category 313, and a time rule 314. Access to the secured area restricted by access control device 116 is based on the amount of time lapsed and the user's prior location. If the user, using his security token 102, enters a restricted area having a site ID 302 corresponding to a green site category 308, the user is free to subsequently enter any site ID 302 having site category 308 noted as any security level of green, yellow, or red. If, however, the user, using his security token 102, enters a restricted area having a site ID 302 corresponding to a yellow site category 308, the user must wait a predetermined amount of time ($t_y$) before entering any site category 308 with a security level of green or yellow (shown as 1 day), and must wait a predetermined amount of time ($t_r$) (shown as 0 day) before entering any site category 308 with a security of red. Finally, if the user, using his security token 102, enters a restricted area having a site ID 302 corresponding to a red site category 308, the user must wait a predetermined amount of time ($t_r$) before entering any site category 308 with a security level of green, yellow, or red (shown as 3 days and 7 days).

The period of time $t_g$, $t_y$, and $t_r$ can be set to any period of time with more or less variables being provided. Preferably, a longer period of time before entering the location with the highest level of security is set to ensure the highest level of safety. It could be, for example, that the restricted area with the highest level of security is most susceptible to harm from outside containments, diseases, pathogens, viruses and bacteria or, alternatively, the most likely to transmit the same. By restricting access with rules to locations based on prior locations, transmissions of diseases, pathogens, viruses and bacteria can be reduced.

Employee table of FIG. 3C, comprises of fields for an employee ID 316 and an employee name 318 for uniquely identifying each individual for the associated security token 102. FIG. 3D comprises of an Employee ID, which corresponds to FIG. 3C, and can have a number of rows corresponding to the number of security levels in a category field 322. A time remaining field 324 contains the amount of time the user needs to lapse before the user can enter into a site having the corresponding security level. In this instance, the employee with employee ID 1 recently entered a siteID with a red security level, and therefore, must wait 3 days before entering a siteID with a green security level or 1 day before entering a siteID with a yellow security level.

FIG. 3E is a device table that keeps track of each access controller 104 with a numerical deviceID field 328 associated with a siteID field 330. A LastPushCompleted Field 332 indicates when access controller 104 was last updated and its status in pushstatus field 334 with the lastupdated field 336.

Figure 4:
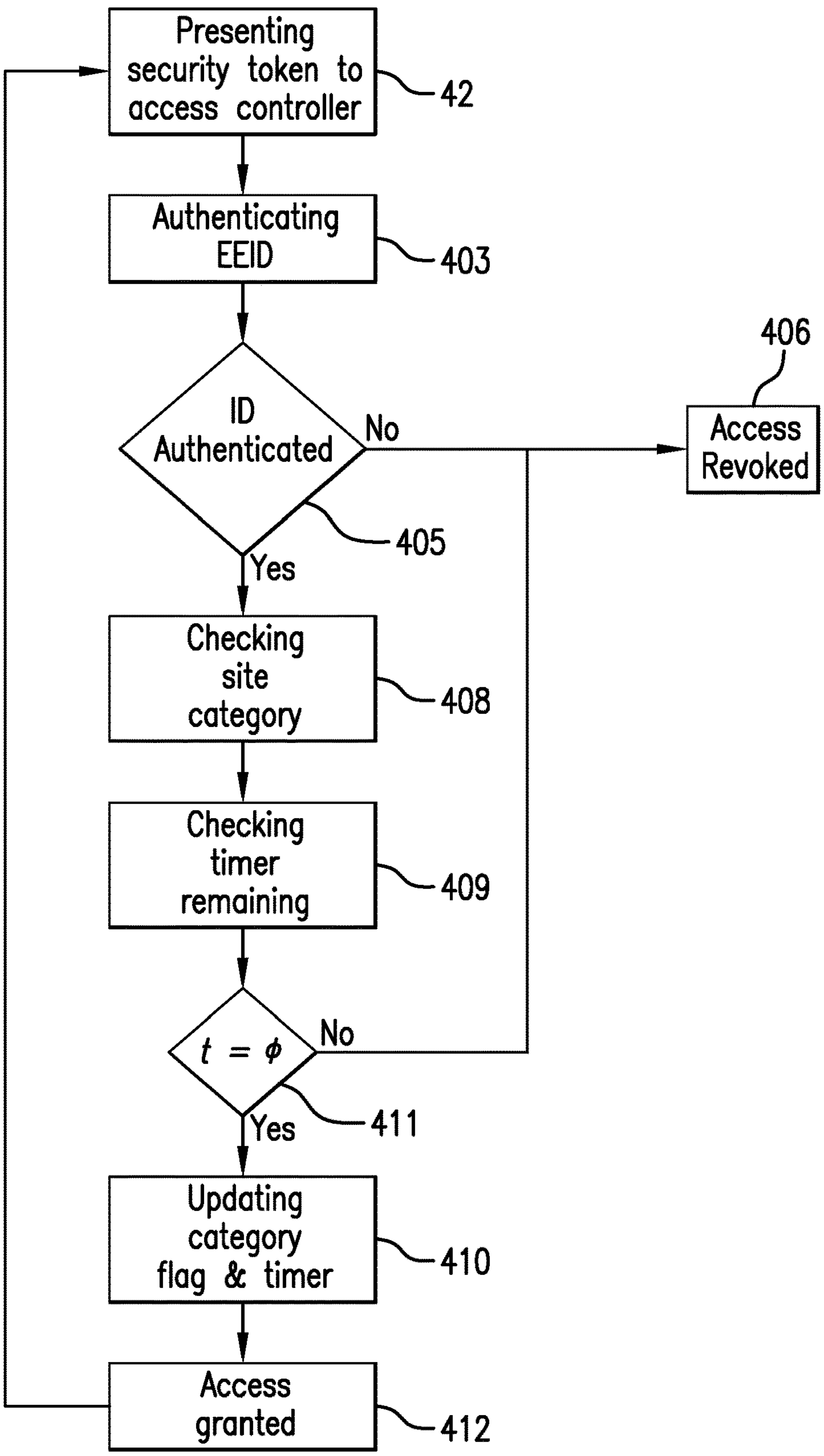
FIG. 4 is a flow chart implementing the methods disclosed herein.

The foregoing can be implemented according to the method shown in FIG. 4. The method begins at step 402 by a user presenting a security token to the access controller. The method continues at step 404 by authenticating the token where a decision is made at step 405 if it is not authenticated, access is revoked at step 406, if it is authenticated, the method continues. The method continues by following user authentication with checking the security level of the site at step 408 and the time remaining on the user's credential before entering the secured location at step 409. At decision step 411, if the time is not zero, then the method returns to step 406 with the user's access is revoked. If the time is zero, at step 410 the user's category flag is updated based on the security level of the location and at step 412 the user is granted access to the secured location. The method then begins again when the user attempts to access a geographically separate or a different secured location.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A system for controlling access to a secured destination location to a holder of a security token, the system comprising:

a database for storing access credentials and rules for entering the secured destination location; and an access controller in communication with the database over a communication channel, wherein the access controller comprises:

a reader for receiving the security token and providing the security token to the database to authenticate an identity of the holder of the security token; and wherein the security token being associated with the rules in the database for entering the secured destination location; and wherein the rules comprise a time field and a prior location information of the security token where entrance to the secured destination location is denied pending a lapse of a predetermined amount of time since the prior location information of the security token was associated in the database; and an access control device for allowing access to the secured destination location upon receipt of an access control signal from the access controller once the predetermined amount of time has lapsed; and wherein the database comprises a site category field configured to have assigned therewith a security level and a time rule, and associating the site category field and the time rule with a site identification ("ID") field in the database, wherein the time rule comprises the predetermined amount of time.

2. The system of claim 1, wherein the communication channel is wireless.

3. The system of claim 1, wherein the access control device is a lock on a door.

4. The system of claim 1, wherein the access controller further comprises of a clock for providing timing information to the time field.

5. The system of claim 1, wherein the database further comprises a site table comprising the site identification ("ID") field to uniquely identify the secured destination location and the site category to assign the security level to the site ID.

6. A system for controlling access to a secured destination location to a holder of a security token, the system comprising:

a database for storing access credentials and rules for entering the secured destination location; and an access controller in communication with the database over a communication channel, wherein the access controller comprises:

a reader for receiving the security token and providing the security token to the database to authenticate an identity of the holder of the security token; and wherein the security token being associated with the rules in the database for entering the secured destination location; and wherein the rules comprise a time field and a prior location information of the security token where entrance to the secured destination location is denied pending a lapse of a predetermined amount of time since the prior location information of the security token was associated in the database; and an access control device for allowing access to the secured destination location upon receipt of an access control signal from the access controller once the predetermined amount of time has lapsed;

wherein the database further comprises a site table comprising a site identification ("ID") to uniquely identify the secured destination location and a site category to assign a security level to the site ID, and wherein the database further comprises a rules table comprising an entrance category, a destination category, and a time rule, wherein the time rule restricts access to the secured destination location based on the site category of the prior location information and the site category of the secured destination location and a predetermined amount of time in the time rule.

7. The system of claim 6, wherein the predetermined amount of time in the time rule is increased based on an increased level of security of the site category.

8. The system of claim 7, wherein the database further comprises an employee table to associate a person with the holder of the security token.

9. The system of claim 8, wherein the database further comprises an employee time table comprising a time remaining field for each site category to provide time remaining information before the person associated with the holder of the security token may enter the secured destination location associated with each site category.

10. The system of claim 9, wherein the database further comprises a device table to associate the access controller at the site ID with last updated timing information.

11. A method for controlling access to a secure destination location, the method comprising:

receiving a security token;

authenticating an identity of a holder of the security token;

denying entrance to the secured destination location pending a lapse of a predetermined amount of time based on a prior location of the holder of the security token; and assigning a security level to a site category field in a database and a time rule for the site category field and associating the site category field and the time rule with a site identification ("ID") field in the database, wherein the time rule comprises the predetermined amount of time.

12. The method of claim 11, restricting access to the secured destination location based on the site category field of the prior location and the predetermined amount of time in the time rule.

13. The method of claim 12, increasing the predetermined amount of time for each time rule based on an increased level of security for the corresponding site category field.

14. The method of claim 13, creating an employee table in the database and associating a person with the holder of the security token.

15. The method of claim 14, providing time remaining information for the person associated with the holder of the security token to enter the destination secured location associated with each site category.

* * * * *